United States Patent [19]

Riesenberg et al.

[11] 4,451,126

[45] May 29, 1984

[54] SURVEY OBJECTIVE

[76] Inventors: Horst Riesenberg, 3, Zenkerweg; Margot Krahn, 4, Am Hang, both of, 69 Jena District of Gera, German Democratic Rep.

[21] Appl. No.: 356,558

[22] Filed: Mar. 24, 1982

[30] Foreign Application Priority Data

May 27, 1981 [DD] German Democratic Rep. ... 230323

[51] Int. Cl.³ .................... G02B 21/02; G02B 15/00
[52] U.S. Cl. .................................................. 350/520
[58] Field of Search ........ 350/520, 254, 507, 559–560, 350/414, 422

[56] References Cited

U.S. PATENT DOCUMENTS 3,572,885  3/1971  Amberg ............................. 350/520

FOREIGN PATENT DOCUMENTS 1029591  5/1958  Fed. Rep. of Germany ...... 350/520
761063  11/1956  United Kingdom ................ 350/520

Primary Examiner—William H. Punter

[57] ABSTRACT

The invention relates to a survey objective for microscopes particularly for the fast changeover from a survey observation of considerable large object fields with high imaging quality to microscopic imaging through objectives of conventional magnification. The invention survey objective is a bipartite lens system, constituted of a first lens member mounted on the lens turret in unit with the microscope objectives also mounted thereupon, and a second lens member switchably arranged in the microscope tube.

1 Claim, 1 Drawing Figure

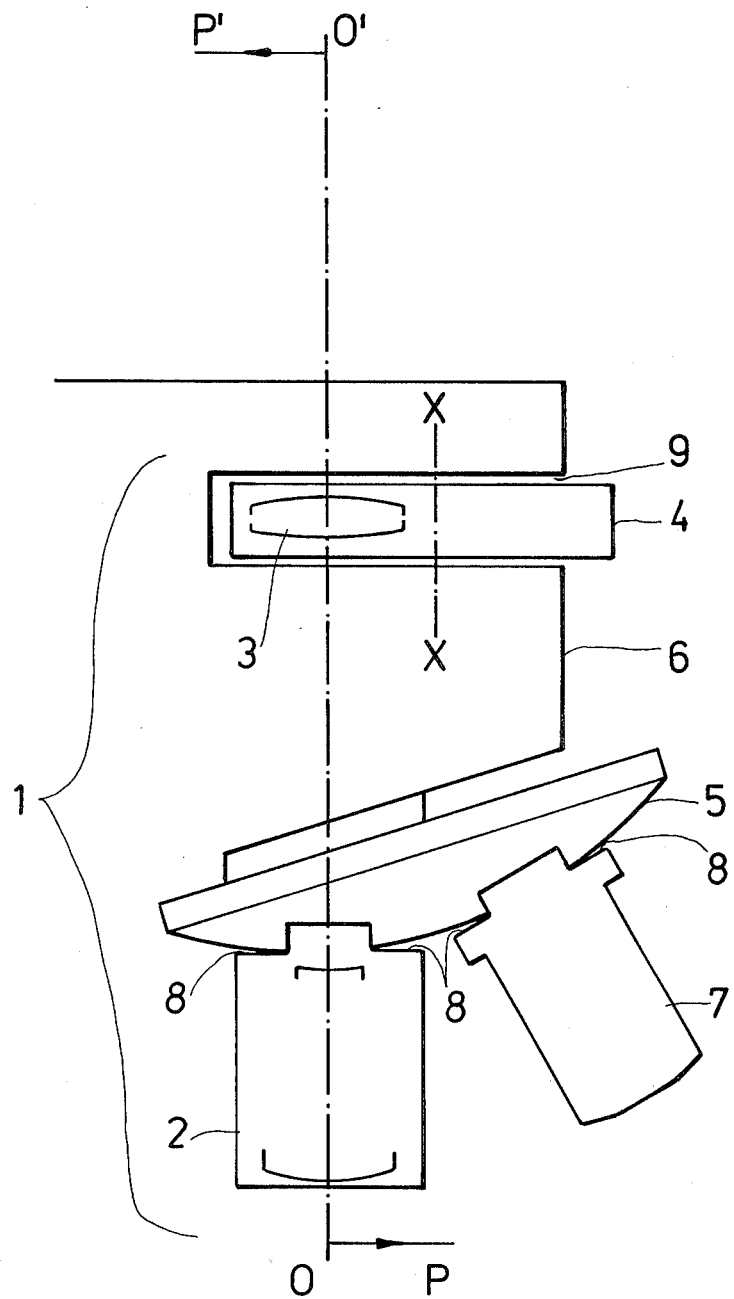

SURVEY OBJECTIVE

The invention relates to a survey objective of low magnification having an imaging scale of between 1 and 1.6 particularly for surveying considerable large object fields.

The survey objective is adapted to microscope objectives of generally used magnifications corrected for infinity. Optical systems having a low image scale, so-called survey objectives, are generally known. Optical systems of this kind have a greater optical-mechanical overall length than microscope objectives of conventional magnification.

The optical-mechanical overall length of a lens is here to be understood as the distance between an object observed and the lens face remote from said object.

Therefore an adaptation is required, which becomes feasible by special mounts for the survey objectives which are exchangeable for the lens turrets of the microscope objectives.

When the survey objective is used with the microscope objective both mounted on a lens turret then it is not adapted to the latter, which requires considerable changes of the microscope setting when a changeover from survey to higher magnifications takes place.

In order to adapt the survey objectives to the microscope objectives of the turrets or of the lens slides the optical and mechanical overall length of the survey objectives is varied through insertion of reflectors into the path of beams in such a manner that it corresponds to that of the microscope objectives.

This arrangement is disadvantageous since the deviation of the optical axis in the survey microscope due to the reflectors renders the objective bulky and complicates the use of the survey microscopes in conventional lens turrets.

It is a further disadvantages that the survey objective requires high expenditure for optical components.

It is further known to reduce the overall length of survey microscopes by optical components without an additional deviation of the path of beams.

Survey objectives of this kind are disadvantageous since their Petzval sum increases with an increased surveying effect thus exceeding the permisseable optical tolerance by far when viewing objects of conventional size of field.

In further known arrangements for survey objectives a Bertrand lens is inserted into and displaceable within a microscope tube, alternatively a Bertrand lens and an additional lens is inserted in a microscope tube.

Such arrangements are disadvantageous since the free openings of the lens turrets limit the size of the microscopic object to be imaged.

Furthermore, the telecentric path of beam suitable for imaging cannot be realised in the object space apart from the fact that the requirements to the imaging quality with respect to large field images cannot be satisfied.

It is an object of the present invention to obviate the above disadvantages.

It is a further object of the present invention to provide a survey objective for use in microscopes which permits a fast changeover from survey observation of large field objects of high imaging quality to microscopic imaging by use of microscope objectives of conventional magnification.

It is still a further object of the present invention to provide a survey objective the mechanical overall length of which is adapted to that of the microscope objective used.

These and other objects are realized in a survey objective for microscopes, particularly for surveying large field microscopic objects constituted of a bipartite optical system, the one portion is mounted in an objective lens turrets for insertion into a microscope path of beams and the other optical system portion is arranged between the lens turret and a microscope tube in said path of beams.

The distance between an object to be observed by said survey objective and a contact face for the objective lens to be inserted into the path of beams is equal. It is an advantage when the optical system portion in said lens turret is displaceable along the optical axis of said lens system portion, which renders the accomodation easier for an observer.

In order that the invention may be more readily understood reference is made to the accompanying drawing which illustrates diagrammatically and by way of example one embodiment thereof and where the FIGURE is a schematic view of a survey objective.

A bipartite survey objective 1 secured to a microscope stage 6 is constituted of a first lens member 2 and a second lens member 3 both members in optical alignment about an optical axis O—O' which also indicates a microscope path of beams. The first lens member is mounted in a lens turret 5 for individual microscope objectives 7 (only one shown). Both, the first lens member 2 and the microscope objective 7 contact the same contact face 8 of the lens turret 5.

The second lens member 3 is inserted into a recess 9 of the microscope stage 6 between a not shown microscope tube and the lens turret 5 into the path of beams O—O', and is mounted into a revolving piece 4, the seating means for which are not shown for sake of simplicity.

Both lens members 2 and 3 of the bipartite survey objective 1 are inserted into or switched out of the path of beams O—O' by the revolving pieces 5 and 4, respectively.

In operation, the first lens member 2 and the second lens member 3 in the position shown in the drawing image an object arranged in an object plane O-P into an intermediate object plane O'-P' of the microscope with an 1:1 image scale.

A subsequent eyepiece is not shown.

In order to utilize higher image scales, the lens turret 5 is rotated to insert the objective 7 into the path of beam O—O', simultaneously the first lens member is rotated out of said beam O—O'.

At the same time, the revolving piece 4 is rotated about an axis X—X and hence the second lens member 3 is removed from the path of beams.

Without any further setting required, the object in the object plane O-P is imaged by the microscope objective 7 into the intermediate plane O'-P'.

The distance between the object plane O-P, on the one hand, and the contact face 8 between the lens turret 5 and the lens member 1 and the objective 7, respectively, is equal.

We claim:

1. A survey objective of microscopes particularly for surveying microscopic objects, comprising
   a bipartite survey objective constituted of a first lens member and a second lens member,
   a lens turret,
   a plurality of microscope objectives, a microscope stage, a revolving piece in a recess of said microscope stage, an object plane, an intermediate image plane, an imaging beam, said first lens member and said plurality of microscope objectives being mounted on said lens turret in symmetrical spaced relation in opposition to said object plane, said lens turret being seated for rotation in said microscope stage, said second lens member being seated on said revolving piece, between said lens turret and said intermediate image plane, said second lens member being insertable into said imaging beam, said object plane, said first lens member and said plurality of microscope objectives, when inserted into said imaging beam, said second lens member, when inserted into the imaging beam, and said intermediate image plane being in optical alignment about said imaging beam, said first lens member having a contact face in opposition to said lens turret, said plurality of microscope objectives having each a contact face in opposition to said lens turret, said object plane and said contact face of said first lens member and of said plurality of microscope objectives, respectively, when inserted into said imaging beam have an equal separation distance.

* * * * *